United States Patent
Landes et al.

(10) Patent No.: US 7,339,782 B1
(45) Date of Patent: Mar. 4, 2008

(54) MULTI-DISPLAY SCREEN CONSOLE WITH FRONT ACCESS

(75) Inventors: Nolan T. Landes, Eagan, MN (US); Michael E. Smith, St. Bonifacius, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 414 days.

(21) Appl. No.: 11/029,607

(22) Filed: Jan. 5, 2005

Related U.S. Application Data

(60) Provisional application No. 60/614,660, filed on Sep. 30, 2004.

(51) Int. Cl.
*G06F 1/16* (2006.01)
(52) U.S. Cl. .................. 361/681; D14/306; 345/1.3
(58) Field of Classification Search ................ 361/681, 361/682; D14/306; 345/1.3
See application file for complete search history.

(56) References Cited

U.S. PATENT DOCUMENTS

| | | | | |
|---|---|---|---|---|
| 4,920,458 A | * | 4/1990 | Jones | .......................... 248/917 |
| 5,537,127 A | * | 7/1996 | Jingu | .......................... 345/1.3 |
| 6,201,532 B1 | * | 3/2001 | Tode et al. | .................. 345/156 |
| 6,212,068 B1 | * | 4/2001 | Rooyakkers et al. | ......... 361/681 |
| 6,449,143 B2 | * | 9/2002 | Rooyakkers et al. | ......... 361/681 |
| 6,560,093 B1 | * | 5/2003 | McLeod et al. | ............. 361/681 |
| D492,676 S | * | 7/2004 | Monson et al. | ............. D14/306 |
| 6,822,855 B2 | * | 11/2004 | Pressley et al. | .............. 361/681 |

* cited by examiner

*Primary Examiner*—Lisa Lea-Edmonds
(74) *Attorney, Agent, or Firm*—Marsh Fischmann & Breyfogle LLP

(57) ABSTRACT

A console (10) includes a housing (14), as well as an upper display module (94) and a lower display module (38). A simple pivotal connection exists between the upper display module (94) and the housing (14) to allow it to move between its closed and open positions. A pair of upper linkages (54) and a pair of lower linkages (66) pivotally interconnect the lower display module (38) with the housing (14) to allow it to move between its closed and open positions. Moving the display modules (38, 94) to their open positions provides access to the interior (22) of the housing (14) and electronics (26) contained therein.

51 Claims, 8 Drawing Sheets

MULTI-DISPLAY SCREEN CONSOLE WITH FRONT ACCESS

CROSS-REFERENCE TO RELATED APPLICATIONS

This patent application claims priority under 35 U.S.C. §119(e) to U.S. Patent Application Ser. No. 60/614,660, that is entitled "Valiant Low Weight Enclosure Front Access," that was filed on Sep. 30, 2004, and the entire disclosure of which is incorporated by reference in its entirety herein.

FIELD OF THE INVENTION

The present invention generally relates to the field of consoles having multiple display screens or panels and, more particularly, to enhancing access to electronics within the interior of such consoles by the manner in which multiple display screens or panels move from their respective closed position to their respective open position.

BACKGROUND OF THE INVENTION

Consoles with one or more display screens are used for various purposes (e.g., missile launch, radar tracking, hazard avoidance). These consoles may be incorporated in any appropriate structure, including without limitation both stationary objects (e.g., buildings or other land-based structures) and movable objects such as on a spacecraft, an aircraft, a boat, ship or other surface watercraft, or a submarine. Access must typically be provided to the interior of consoles of this general type in order to perform maintenance on the associated electronics. One way in which this has been done in the past is through use of a removable panel. Another way in which this has been done is through use a panel that may be pivoted about a single, stationary axis from between closed and open positions. These options may not be suitable for one or more applications, such as when the console is incorporated into a small space.

BRIEF SUMMARY OF THE INVENTION

A first aspect of the present invention is embodied by a console having a housing, as well as upper and lower panels or display modules. The upper display module is pivotally interconnected with the housing. First, second, third, and fourth linkages movably interconnect the housing with the lower display module. Electronics within the housing are accessible by moving each of the upper and lower display modules from a closed position to an open position.

Various refinements exist of the features noted in relation to the first aspect of the present invention. Further features may also be incorporated in the first aspect of the present invention as well. These refinements and additional features may exist individually or in any combination. The console may be used to provide any appropriate function, including without limitation missile launch control, radar tracking, or hazard avoidance. The console also may be incorporated in any appropriate structure, including without limitation both stationary objects (e.g., buildings or other land-based structures) and movable objects such as on a spacecraft, an aircraft, a boat, ship or other surface watercraft, or a submarine. Typically the upper and lower display modules will be on a common side of the console. For instance, in one embodiment the back of the console is disposed against a bulkhead or the like, or is otherwise inaccessible, and the upper and lower display modules are on the front of the console. This not only allows for appropriate viewing by operations personnel or the like of the upper and lower display modules when in their respective closed positions, but allows maintenance personnel or the like to gain access to the interior of the console simply by moving the upper and lower display modules to their respective open positions. Preferably, the upper and lower display modules are also visible to at least some degree when in their respective open positions. For instance, the upper display module may include a screen that faces or projects at least generally upwardly when in its open position, while the lower display module may include a screen that faces or projects at least generally downwardly when in its open position.

At least one actuator or biasing member may further interconnect the housing and the upper display module, such as to facilitate movement of the upper display module from its closed position to its open position or to bias the upper display module toward its open position. In one embodiment, each such actuator or biasing member is a passive device in that an actuation signal is not required. However, any appropriate actuator or biasing member may be utilized. The upper display module may include a pair of sides that are spaced in a lateral dimension, and first and second upper actuators or biasing members may interconnect with the upper display module at locations that are spaced in this lateral dimension. Both the first and second upper actuators may include a first end that is pivotally interconnected with the housing, as well as a second end that is pivotally interconnected with the upper display module at locations that are spaced in the lateral dimension.

The above-noted first and second upper actuators associated with the upper display module may be of any appropriate type. For instance, the first and second upper actuators each may be in the form of an extendable/retractable linear actuator or an extendable/retractable gas cylinder. In one embodiment, the upper display module is pivotable about a single, stationary axis to move between its closed and open positions. The first and second upper actuators may exert a force on the upper display module relatively close to this pivot axis. It may be possible to integrate the actuator or biasing member in the interconnection of the upper display module to the housing (e.g., a spring hinge).

The first, second, third, and fourth linkages each may be in the form of a single link. In this regard, the lower display module may include first and second sides that are spaced in a lateral dimension, as well as upper and lower edges. The above-noted single link linkages may be arranged such that: 1) the first and third linkages (e.g., "upper" linkages) each interconnect with the housing at locations that are spaced along a common first axis; 2) the first and third linkages (e.g., "upper" linkages) each interconnect with the lower display module at locations that are spaced along a common second axis; 3) the second and fourth linkages (e.g., "lower" linkages) each interconnect with the housing at locations that are spaced along a common third axis; and 4) the second and fourth linkages (e.g., "lower" linkages) each interconnect with the lower display module at locations that are spaced along a common fourth axis. The following additional features may be used in this characterization of the arrangement, alone or in any combination: 1) the first, second, third, and fourth axes may be parallel; 2) the first axis (e.g., coinciding with the interconnection between the "upper" linkages and the housing) may be disposed at a higher elevation than the third axis (e.g., coinciding with the interconnection between the "lower" linkages and the housing); 3) the second axis (e.g., coinciding with the interconnection between the "upper" linkages and the lower display module) may be closer to the upper edge of the lower display module than the fourth axis (e.g., coinciding with the interconnection between the "lower" linkages and the lower display module); 4) the third axis (e.g., coinciding with the interconnection between the "lower" linkages and the housing) may be more forwardly disposed than the first axis (e.g., coinciding with the interconnection between the "upper" linkages and the housing); 5) the console may further include first and second lower actuators or biasing members that are each interconnected with the housing; 6) the first lower actuator may be interconnected with the second linkage (e.g., a "lower" linkage) at an intermediate location between the third and fourth axes (e.g., where this particular "lower" linkage interconnects with the housing and lower display module, respectively); and 7) the second lower actuator may be interconnected with the fourth linkage (e.g., a "lower" linkage) at an intermediate location between the third and fourth axes (e.g., where this particular "lower" linkage interconnects with the housing and lower display module, respectively).

It may be such that only a pair of pivots are provided for each of the first, second, third, and fourth linkages—one between a given linkage and the housing and the other between the given linkage and the lower display module. That is, the first, second, third, and fourth linkages each may be movable at two distinct locations—one being at its interconnection with the housing and the other being at its interconnection with the lower display module. First and second lower actuators or biasing members may provide a further interconnection between the housing and the second and fourth linkages, respectively (e.g., the "lower" linkages). The first lower actuator may exert a force on the second linkage (e.g., a "lower" linkage) closer to its pivotal connection with the housing than its pivotal connection with the lower display module. Similarly, the second lower actuator may exert a force on the fourth linkage (e.g., a "lower" linkage) closer to its pivotal connection with the housing than its pivotal connection with the lower display module.

The lower display module may include first and second sides that are spaced in a lateral dimension, as well as upper and lower edges that are spaced in a longitudinal dimension. The first, second, third, and fourth linkages may be arranged such that: 1) the first linkage (e.g., an "upper" linkage associated with the first side of the lower display module) interconnects the housing with a first location on the lower display module; 2) the second linkage (e.g., a "lower" linkage associated with the first side of the lower display module) interconnects the housing with a second location on the lower display module that is longitudinally spaced from the first location (where the first linkage interconnects with the lower display module); 3) the third linkage (e.g., an "upper" linkage associated with the second side of the lower display module) interconnects the housing with a third location on the lower display module that is laterally spaced from the first location (where the first linkage interconnects with the lower display module) and 4) the fourth linkage (e.g., a "lower" linkage associated with the second side of the lower display module) interconnects the housing with a fourth location on the lower display module that is laterally spaced from the second location (where the second linkage interconnects with the lower display module) and longitudinally spaced from the third location (where the third linkage interconnects with the lower display module). A number of additional characterizations may be made in relation to the arrangement of the first, second, third, and fourth linkages presented in this paragraph.

One characterization is that the first and third locations may be disposed closer to the upper edge of the lower display module than the second and fourth locations. Another is that the interconnection of the first and third linkages (e.g., "upper" linkages") with the housing is within a first vertical reference plane, and the interconnection of the second and fourth linkages (e.g., "lower" linkages") with the housing is within a second vertical reference plane, with the second vertical reference plane being more forwardly disposed than the first vertical reference plane. First and second lower actuators or biasing members may extend between the housing and the second and fourth linkages, respectively (e.g., "lower" linkages). The first lower actuator may exert a force on the second linkage (e.g., a "lower" linkage) closer to its interconnection with the housing than its interconnection with the lower display module. Similarly, the second lower actuator may exert a force on a fourth linkage (e.g., a "lower" linkage) closer to its interconnection with the housing than its interconnection with the lower display module.

At least one actuator or biasing member may further interconnect the housing and the lower display module, such as to facilitate movement of the lower display module from its closed position to its open position or to bias the lower display module toward its open position. Any appropriate type of actuator or biasing member may be utilized, and may be integrated in any appropriate arrangement (e.g., a linear actuator, a gas cylinder). In one embodiment, each such actuator or biasing member is a passive device in that an actuation signal is not required.

How the upper and lower display modules each move from their respective closed position to their respective open position is subject to a number of characterizations. The upper display module may go through a simple pivotal motion, and its screen may project or face at least generally upwardly when in its open position. The lower display module may go through a more complex motion, and its screen may project or face at least generally downwardly when in its open position. In one embodiment, the upper screen of the display module is at least generally horizontally disposed when in its open position, while the lower screen of the display module faces both downwardly and forwardly to allow both such screens to be viewed when in their respective open positions.

The first, second, third, and fourth linkages may be arranged such that a first location on the lower display module pivots about a first axis as the lower display module moves from its closed to its open position, and such that the lower display module also pivots about a second axis that extends through this first location as the lower display module moves from its closed to its open position. The first and second axes may be disposed in parallel relation. The first location may pivot about the first axis in a first direction as the lower display module moves from its closed to its open position, while the lower display module may pivot about the second axis in a second direction as the lower display module moves from its closed to its open position, with the first and second directions being opposite to each other and when the first and second axes are viewed from a common vantage point. For instance, in the event that the first location pivots in a clockwise direction about the first axis as the lower display module moves from its closed to its open position, the lower display module will pivot about the second axis in a counter-clockwise direction as the lower display module moves from its closed to its open position.

There are additional ways of characterizing the motion of the lower display module as it moves between its closed and open positions. The first, second, third, and fourth linkages may be arranged and interconnected with the housing and lower display module such that the lower display module simultaneously pivots about two different axes when moving between its closed and open positions. These two axes may be parallel and may coincide with where the first, second, third, and fourth linkages interconnect with the housing.

A second aspect of the present invention is embodied by a console having a housing, as well as upper and lower panels or display modules. Both the upper and lower display modules are movable between closed and open positions. The lower display module is interconnected with the housing so as to simultaneously pivot about two different axes when moving between its closed and open positions. Electronics are located within the interior of the housing. Access to the electronics may be provided by moving the upper and lower display modules to their respective open positions.

Various refinements exist of the features noted in relation to the second aspect of the present invention. Further features may also be incorporated in the second aspect of the present invention as well. These refinements and additional features may exist individually or in any combination. The multiple pivoting motion of the lower display module may be realized by interconnecting the housing and lower display module with first, second, third, and fourth linkages in the manner discussed above in relation to the first aspect. Each of the various features discussed above in relation to the first aspect may be used by this second aspect, alone or in any combination.

DETAILED DESCRIPTION OF THE INVENTION

Figure 1B:
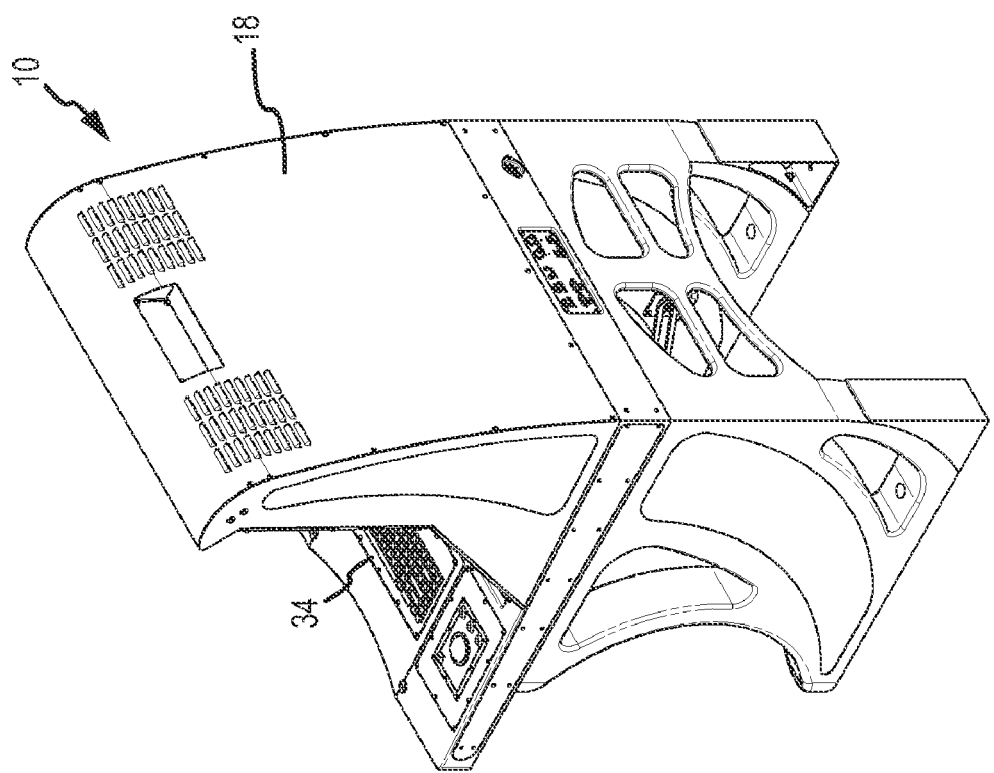
FIG. 1B is a perspective back view of the console in the FIG. 1A configuration.
Figure 1A:
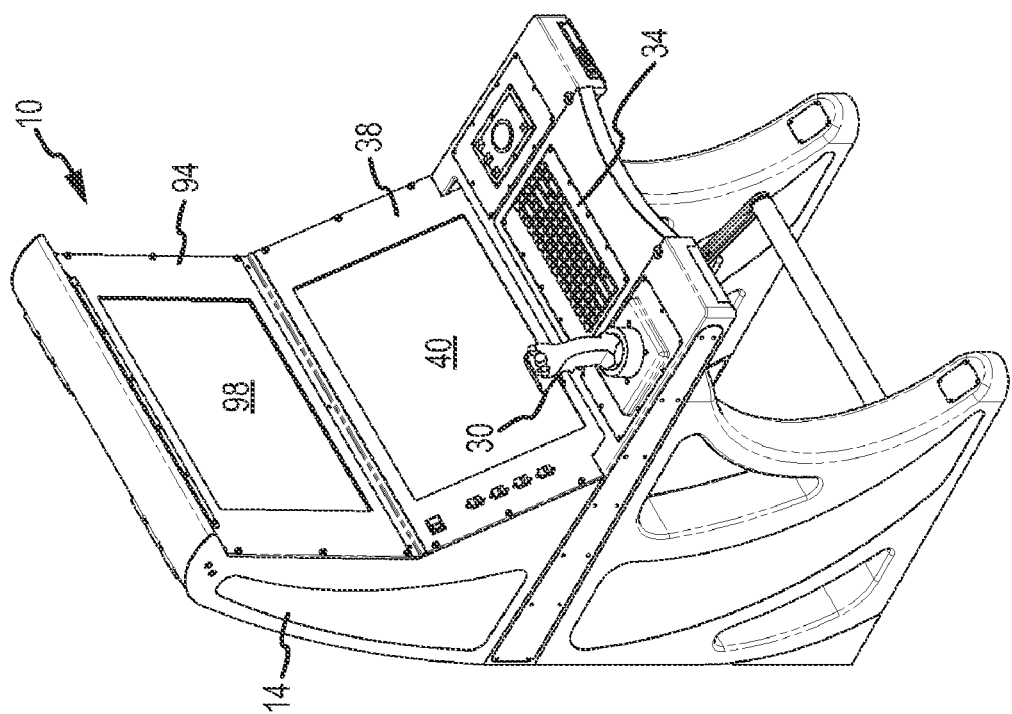
FIG. 1A is a perspective front view of one embodiment of a multi-display screen console having a front access to its interior, and with both display modules being in their respective closed positions.
Figure 1C:
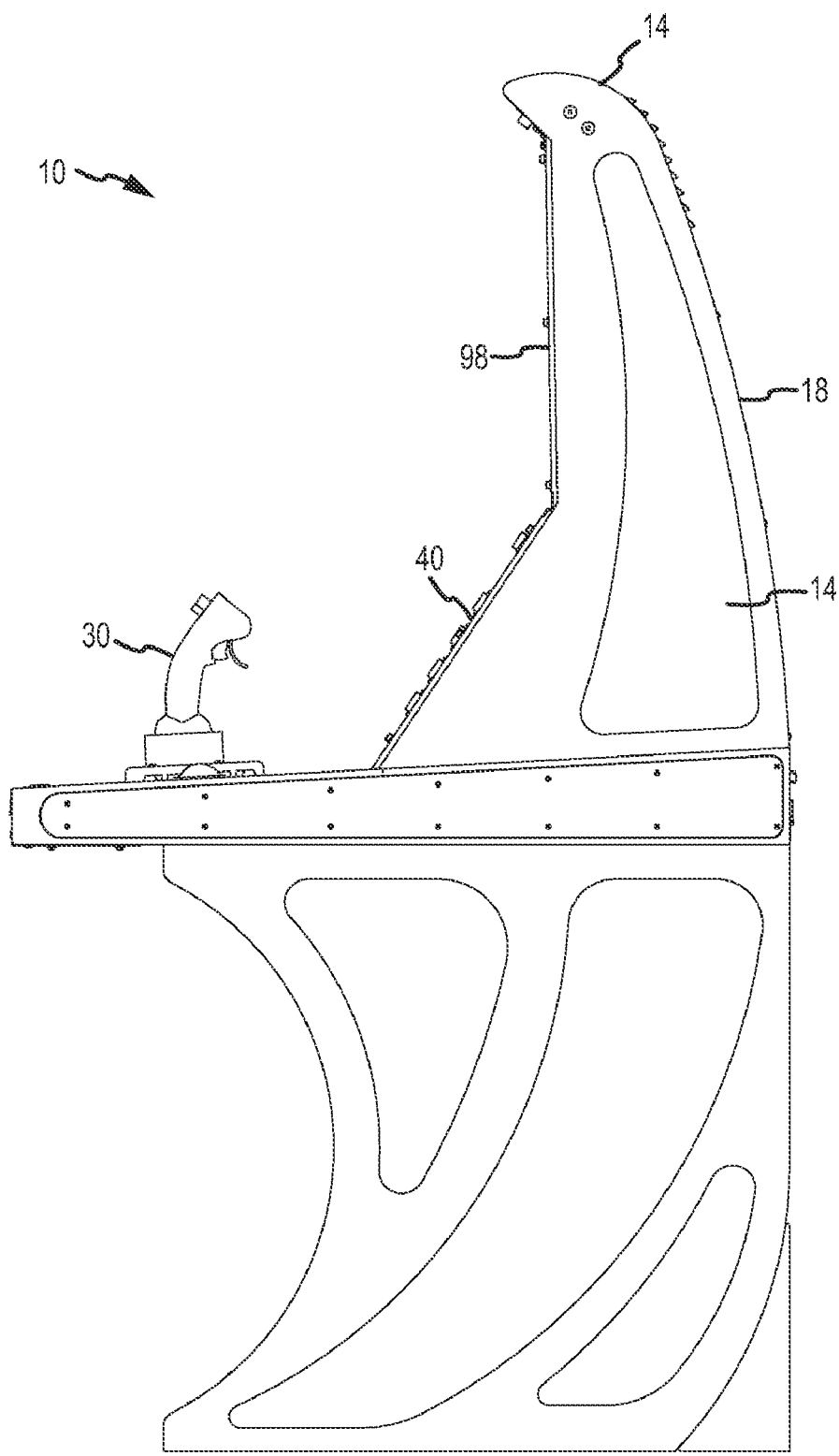
FIG. 1C is a side view of the console in the FIG. 1A configuration.

The present invention will now be described in relation to the accompanying drawings which at least assist in illustrating its various pertinent features. One embodiment of console with multiple display modules that are movable to provide front access to its interior is illustrated in FIGS. 1A-C and is identified by reference numeral 10. The console 10 includes a housing 14, as well as a lower display module 38 and an upper display module 94 that are both movably interconnected with the housing 14 in a manner that will be discussed in more detail below. The lower display module 38 includes a screen 40, while the upper display module 94 includes a screen 98. Each of the screens 40, 98 may be touch-activated, may provide a display function, or both.

The lower display module 38 is oriented such that its screen 40 projects both horizontally and upwardly when in its closed position. The lower display module 38 includes an upper edge 42, a lower edge 46, and a pair of sides 50 (see also FIGS. 2F-G). The upper display module 94 is oriented such that its screen 98 projects horizontally (e.g., the screen 98 is disposed within a vertical reference plane). The upper display 94 module includes an upper edge 102, a lower edge 106, and a pair of sides 110 (see also FIGS. 2D-E). The lower edge 106 of the upper display module 94 may be configured to "capture" the upper edge 42 of the lower display module 38 when the display modules 38, 94 are in their respective closed positions (FIGS. 1A-C). That is, the lower edge 106 of the upper display module 94 may forcibly retain the lower display module 38 in its closed position.

The console 10 may be used to provide any appropriate function or combinations of functions, including without limitation missile launch control, radar tracking, or hazard avoidance. In this regard, the console 10 may include one or more components to support its functionality, such as a joystick 30 and a keyboard 34. The console 10 also may be incorporated in any appropriate structure, including without limitation both stationary objects (e.g., buildings or other land-based structures) and movable objects such as on a spacecraft, an aircraft, a boat, ship or other surface watercraft, or a submarine. It should be appreciated that the size and/or shape of the console 10 may be adapted for the quarters in which it is to be used. For instance and in the case of the illustrated embodiment, the housing 14 of the console 10 includes a back 18 that is shaped to follow the contour of an aircraft fuselage.

Figure 2B:
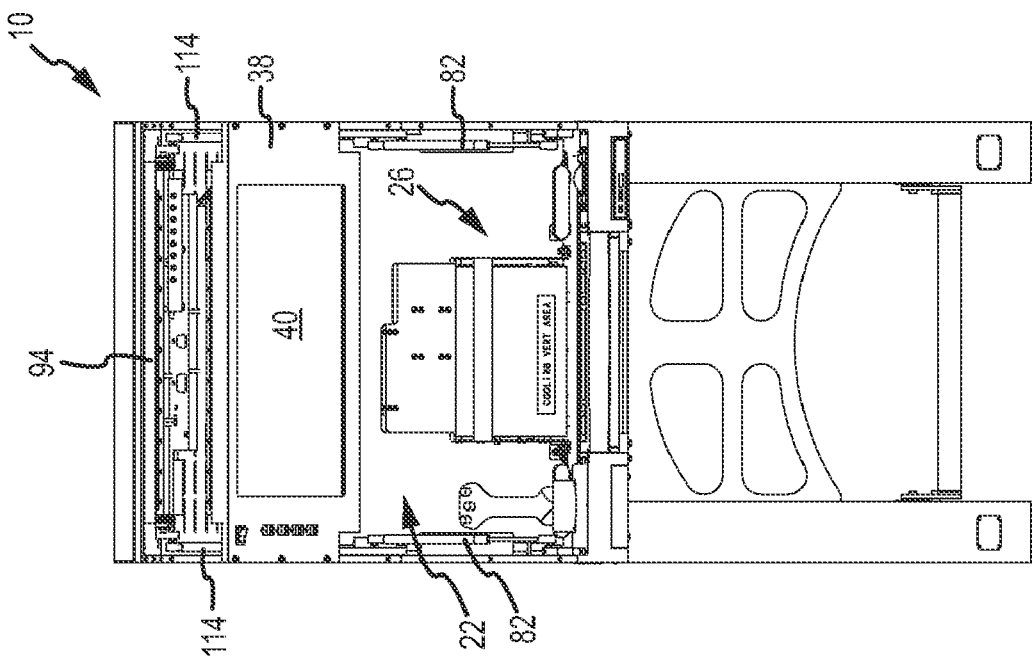
FIG. 2B is a front view of the console in the FIG. 2A configuration.
Figure 2A:
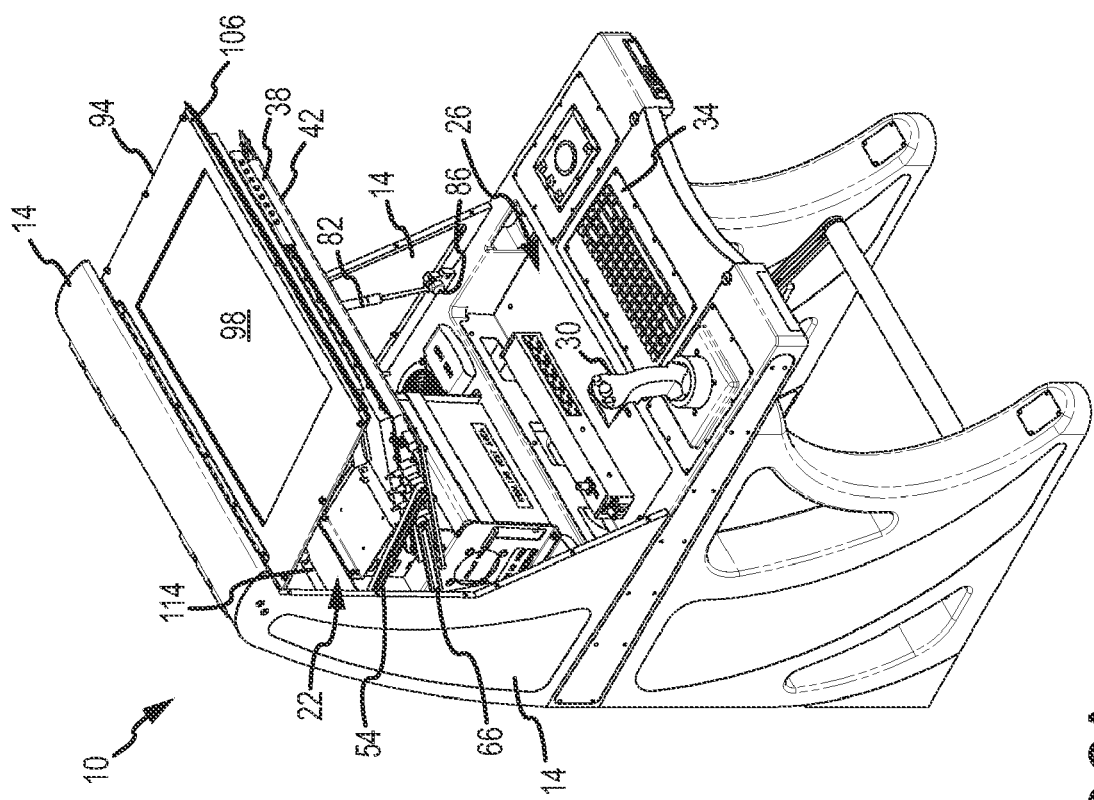
FIG. 2A is a perspective view of the console of FIG. 1A, but with both display modules being in their respective open positions.
Figure 2C:
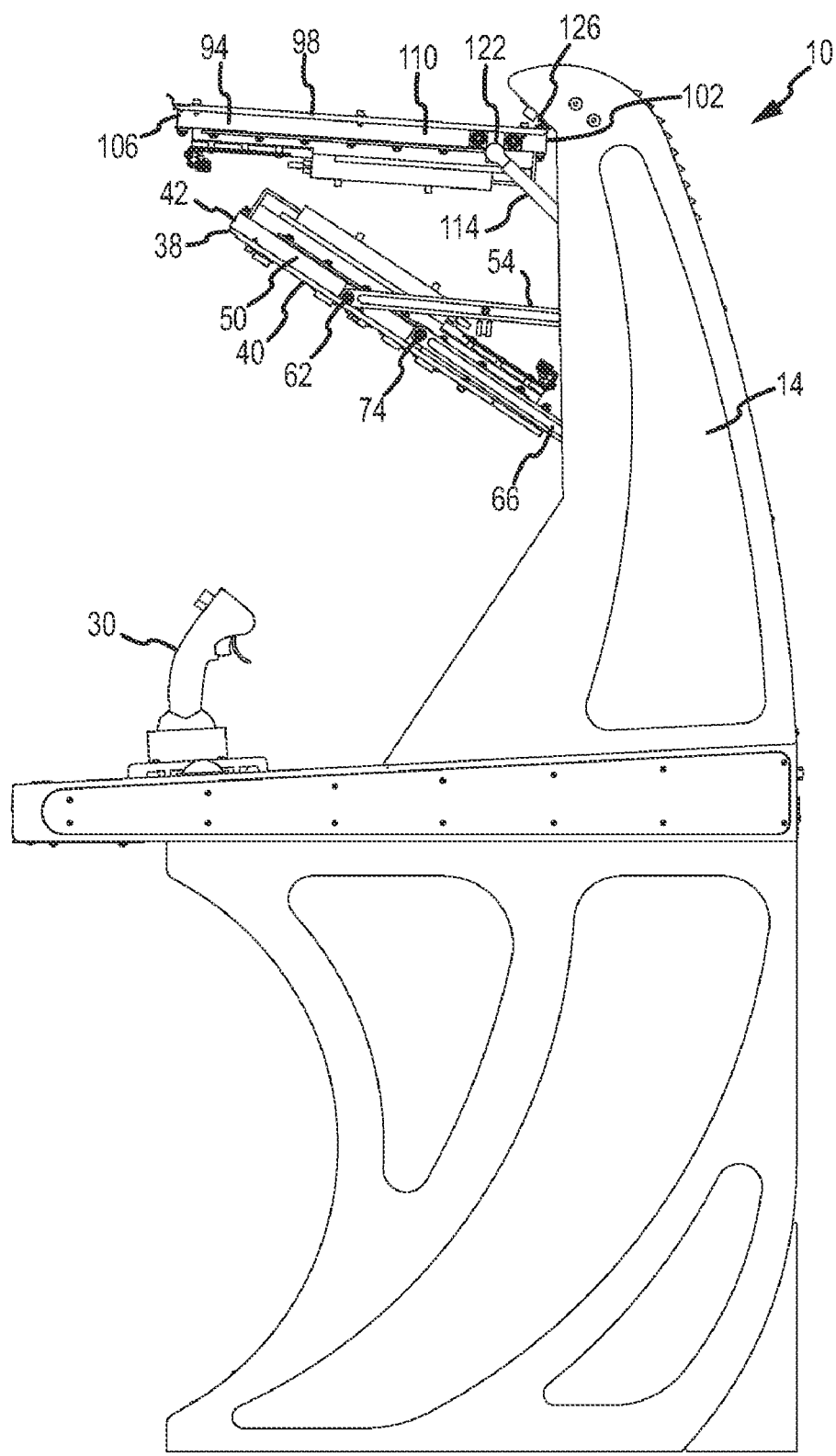
FIG. 2C is a side view of the console in the FIG. 2A configuration.

Both the lower display module 38 and the upper display module 94 are movably interconnected with the housing 14 of the console 10. FIGS. 1A-C illustrate the display modules 38, 94 in their respective open positions as noted. FIGS. 2A-C illustrate the display modules 38, 94 in their respective open positions. Disposing the display modules 38, 94 in their respective open positions provides access to the interior 22 of the housing 14. Various electronics 26 (e.g., one or more processors, disk drives) may be contained within the interior 22 of the housing 14. Access to the interior 22 may be required to service and/or replace one or more components located within the interior 22. How the display modules 38, 94 are movably interconnected with the housing 14, as well as their location, facilitates access to the interior 22 while still allowing viewing of both screens 40, 98 when the display modules 38, 94 are in their respective open positions, which may be required while performing maintenance operations.

The upper display module 94 is movably interconnected with the housing 14 to undergo a simple pivotal motion. In this regard, a hinge 126 of any appropriate type interconnects the upper display module 94 with the housing 14 and allows the upper display module 94 to pivot relative to the housing 14 about a single stationary pivot axis 130 (FIG. 2E). A pair of upper biasing members or actuators 114 of any appropriate size, shape, and configuration (e.g., a gas cylinder) bias the upper display module 94 toward its open position (e.g., to exert a force on the upper display module 94 that would tend to at least move the same toward its open position). Any type of latch (not shown) may be used to retain the upper display module 94 in its closed position (FIGS. 1A-C). Upon deactivation of this latch, the upper actuators 114 themselves could move the upper display module 94 from the position illustrated in FIGS. 1A-C to the position illustrated in FIGS. 2A-C. However, it may be necessary for personnel to provide some assistance (e.g., to exert a lifting force on the upper display module 94 as well). In any case, the upper actuators 114 preferably exert a sufficient force on the upper display module 94 to maintain the upper display 94 in its fully open position (FIGS. 2A-C).

The lower display module 38 is also movably interconnected with the housing 14, but undergoes a more complex motion than the upper display module 94 when moving between its closed position (FIGS. 1A-C) and fully open position (FIGS. 2A-C). A pair of upper links or linkages 54 interconnect the lower display module 38 and the housing 14, as do a pair of lower links or linkages 66. A pair of lower actuators 82 of any appropriate size, shape, and configuration (e.g., a gas cylinder) bias the lower display module 38 toward its open position (e.g., exert a force on the lower display module 38 that would tend to at least move the same toward its open position). In the illustrated embodiment, one lower actuator 82 exerts a force on one of the lower linkages 66, while the other lower actuator 82 exerts a force on the other lower linkage 66. Any type of latch (not shown) may be used to retain the lower display module 38 in its closed position. This "latch" could be in the form of the lower edge 106 of the upper display module 94 "capturing" the upper edge 42 of the lower display module 38 as noted. A different latch (or a supplemental latch for that matter) could also be used to retain the lower display module 38 in its closed position. In any case and upon deactivation of all relevant latches, the lower actuators 82 themselves could move the lower display module 38 from the position illustrated in FIGS. 1A-C to the position illustrated in FIGS. 2A-C. However, it may be necessary for personnel to provide some assistance (e.g., to exert a lifting force on the lower display module 38). In any case, the lower actuators 82 preferably exert a sufficient force on the lower display module 38 to maintain the lower display 38 in its fully open position (FIGS. 2A-C).

Figure 2D:
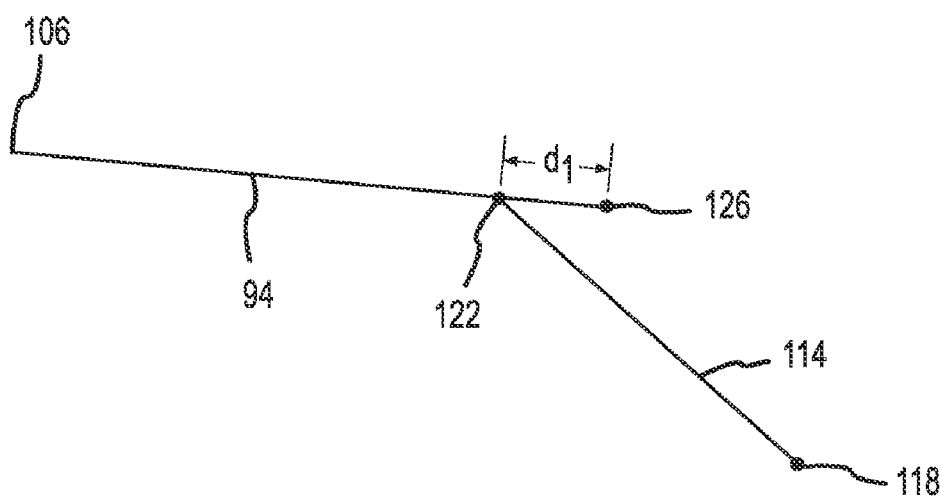
FIG. 2D is a side view (schematic) of the upper display module in the FIG. 2A configuration.
Figure 2E:
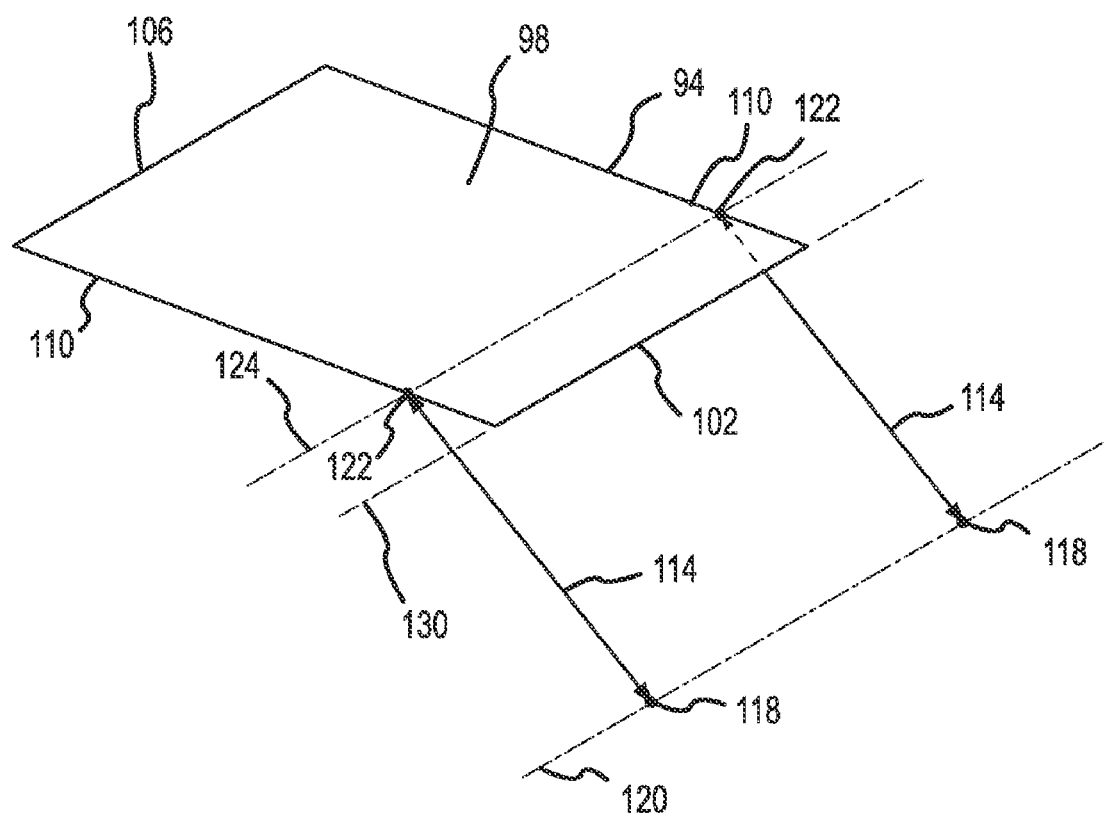
FIG. 2E is a perspective view (schematic) of the upper display module in the FIG. 2A configuration.

Further details regarding the movable interconnection between the housing 14 and the upper display module 94 are illustrated in FIGS. 2D-E, in addition to FIGS. 2A-C. One end of each upper actuator 114 is interconnected with the housing 14 by a pivot pin 118, while the opposite end of each upper actuator 114 is interconnected with the upper display module 94 by a pivot pin 122. The pivot pins 118 (between the upper actuators 114 and the housing 14) are spaced along a common axis 120, while the pivot pins 122 (between the upper actuators 114 and the upper display module 94) are spaced along a common axis 124. In the illustrated embodiment, both of these axes 120, 124 are parallel with the pivot axis 130 of the upper display module 94.

Generally, one upper actuator 114 may be characterized as being associated with one side 110 of the upper display module 94, while the other upper actuator 114 may be characterized as being associated with the opposite side 110 of the upper display module 94. The upper edge 102 and the lower edge 106 of the upper display module 94, as well as the axis 120 (associated with pivot pins 118 between the upper linkages 114 and the housing 14), axis 124 (associated with the pivot pins 122 between the upper linkages 114 and the upper display module 94), and the pivot axis 130 about which the upper display module 94 moves may be characterized as extending in the lateral dimension. The sides 110 of the upper display 94 thereby may be characterized as being laterally spaced. The upper actuators 114 in turn may be characterized as exerting a force on the upper display module 94 at a pair of laterally spaced locations. The upper actuators 114 exert a force on the upper display module 94 at a location that is relatively close to the hinge 126 to further enhance access to the interior 22 of the housing 14. The upper actuators 114 each exert a force on the upper display 94 at a location that is spaced from the pivot axis 130 for the upper display module 94 by a distance $d_1$.

Figure 2F:
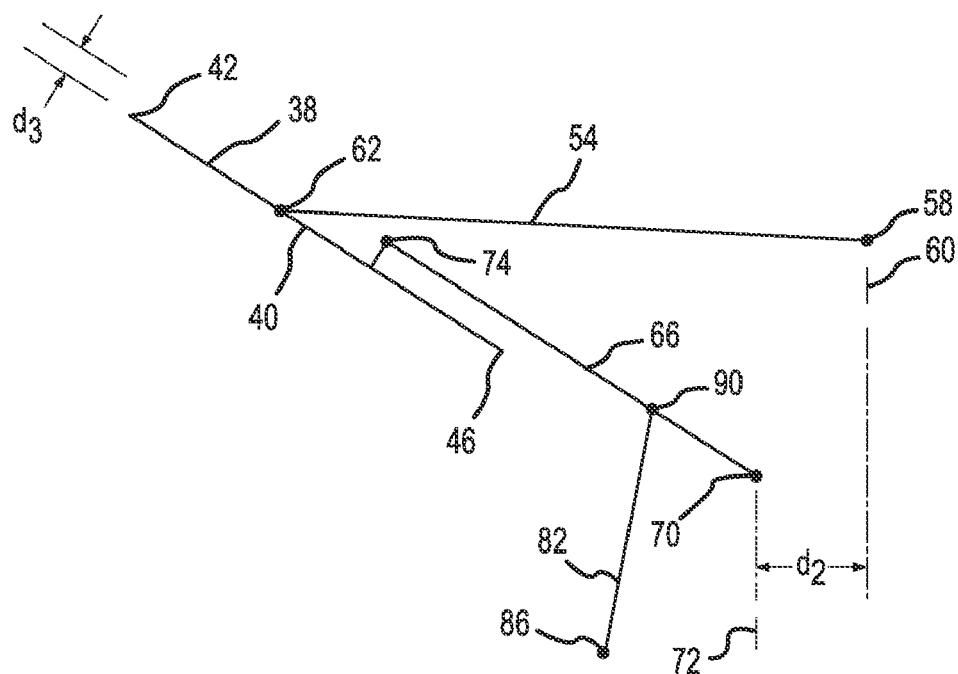
FIG. 2F is a side view (schematic) of the lower display module in the FIG. 2A configuration.
Figure 2G:
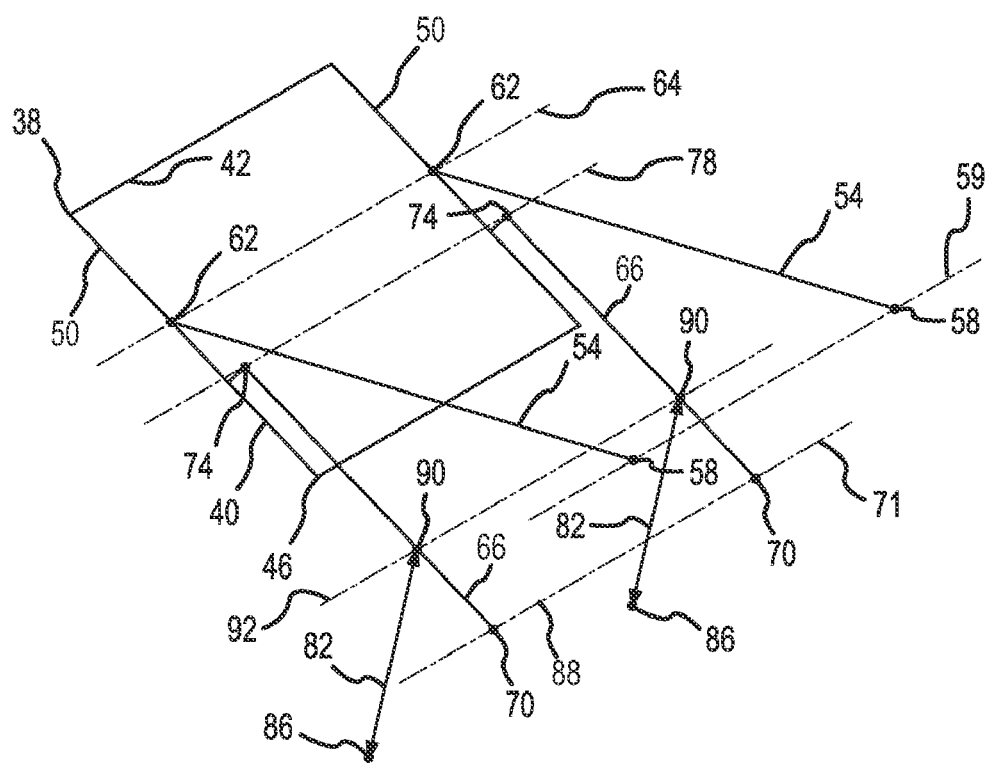
FIG. 2G is a perspective view (schematic) of the upper display module in the FIG. 2A configuration.

Further details regarding the interconnection between the housing 14 and the lower display module 38 are illustrated in FIGS. 2F-G, in addition to FIGS. 2A-C. One end of each upper linkage 54 is interconnected with the housing 14 by a pivot pin 58, while the opposite end of each upper linkage 54 is interconnected with the lower display module 38 by a pivot pin 62. The pivot pins 58 are spaced along a common axis 59, while the pivot pins 62 are spaced along a common axis 64. In the illustrated embodiment, these axes 59, 62 are parallel with the pivot axis 130 of the upper display module 94.

One end of each lower linkage 66 is interconnected with the housing 14 by a pivot pin 70, while the opposite end of each lower linkage 66 is interconnected with the lower display module 38 by a pivot pin 74. The pivot pins 70 are spaced along a common axis 71, while the pivot pins 74 are spaced along a common axis 78. In the illustrated embodiment, both of these axes 71, 78 are parallel with the pivot axis 130 of the upper display module 94.

The upper linkages 54 and lower linkages 66 are each in the form of a single link in the illustrated embodiment. That is, there is not an intermediate pivot pin in the upper linkages 54 between their respective pivot pins 58, 62. Similarly, there is not an intermediate pivot pin in the lower linkages 66 between their respective pivot pins 70, 74. Stated another way, the entirety of each upper linkage 54 and each lower linkage 66 moves relative to the housing 14 via their respective pivot pins 58, 62, 70, 74. Any appropriate configuration may be used by the upper linkages 54 and lower linkages 66.

There are a number of interrelationships of note between the upper linkages 54, the lower linkages 66, and their respective interconnections with the housing 14 and lower display module 38, including: 1) the pivot pins 58 that pivotally interconnect the upper linkages 54 with the housing 14 are disposed at a higher elevation (e.g., more vertically disposed) than the pivot pins 70 that pivotally interconnect the lower linkages 66 with the housing 14; 2) the pivot pins 70 that pivotally interconnect the lower linkages 66 with the housing 14 are more forwardly disposed than the pivot pins 58 that pivotally interconnect the upper linkages 54 with the housing 14, which is represented by the distance $d_2$ in FIG. 2F (the pivot pins 58 being disposed within one vertical reference plane 60 and the pivot pins 70 being disposed within another vertical reference plane 72 that is spaced from the vertical reference plane 60 by the noted distance $d_2$, with the vertical reference plane 72 being more forwardly disposed); 3) the pivot pins 62 that pivotally interconnect the upper linkages 54 with the lower display module 38 are disposed closer to the upper edge 42 of the lower display module 38 than the pivot pins 74 that pivotally interconnect the lower linkages 66 with the lower display module 38; 4) the pivot pins 62 that pivotally interconnect the upper linkages 54 with the lower display module 38 are offset from the pivot pins 74 that pivotally interconnect the lower linkages 66 with the lower display module 38 in a direction that is perpendicular to the screen 40 of the upper display module 38, which is represented by distance $d_3$ in FIG. 2F; and 5) the upper linkages 54 are longer than the lower linkages 66 (more specifically, the distance between the pivot pins 58, 62 associated with the upper linkages 54 is greater than the distance between the pivot pins 70, 74 associated with the lower linkages 66). The offset represented by distance $d_3$ facilitates "lifting" of the lower display module 38.

Continuing to refer to FIGS. 2A-C and 2F-G, the lower actuators 82 again at least bias the lower display module 38 toward its open position. One end of each lower actuator 82 is interconnected with the housing 14 by a pivot pin 86, while the opposite end of each lower actuator 82 is interconnected with its corresponding lower linkage 66 by a pivot pin 90. The pivot pins 86 are spaced along a common axis 88, while the pivot pins 90 are spaced along a common axis 92. In the illustrated embodiment, both axes 88, 92 are parallel with the pivot axis 130 of the upper display module 94. The pivot pins 90 (the interconnection between the lower actuators 82 and the lower linkage 66) are closer to their corresponding pivot pin 70 (the interconnection between the corresponding lower linkage 66 and the housing 14) than to their corresponding pivot pin 74 (the interconnection between the corresponding lower linkage 66 and the lower display module 38).

Figure 3C:
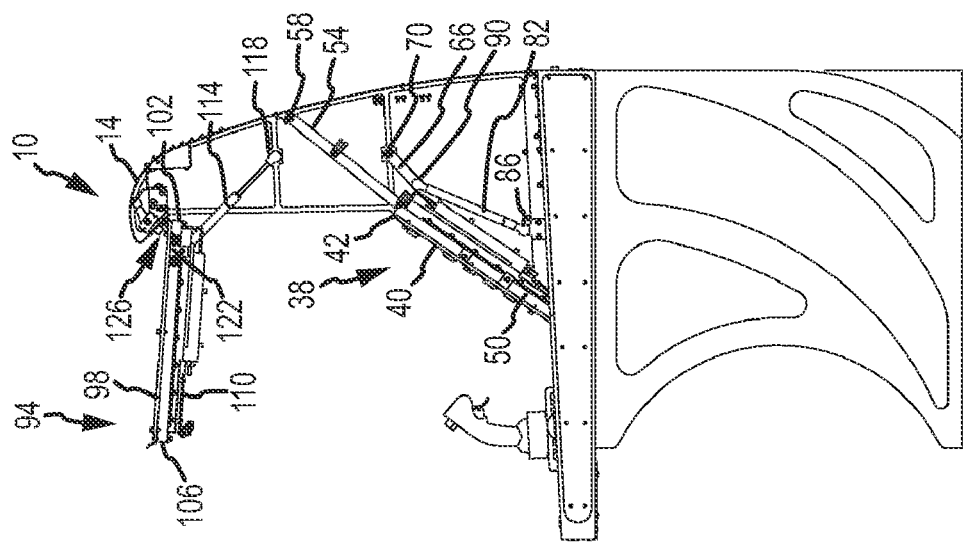
FIGS. 3A-C are sequential views of the opening of the upper display module.
Figure 3B:
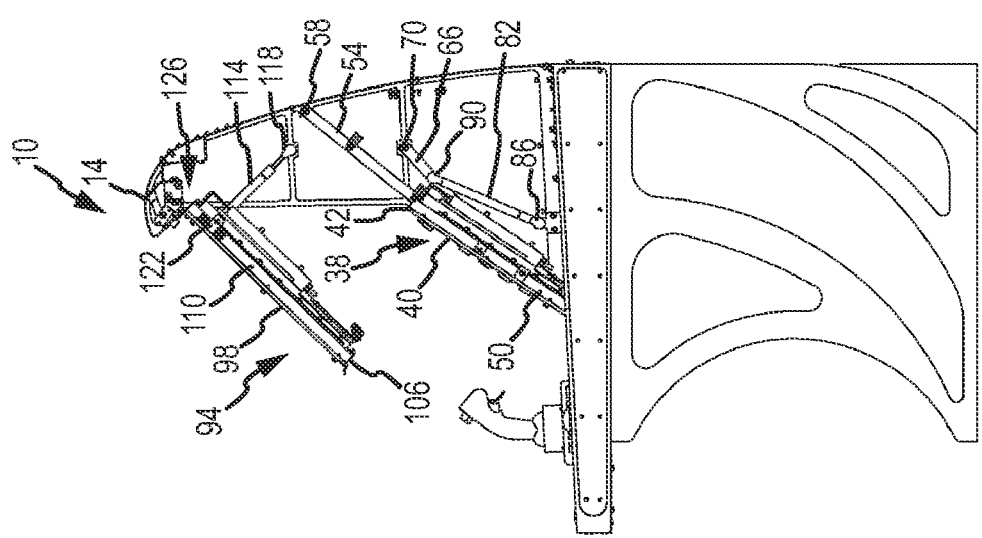
Figure 3A:
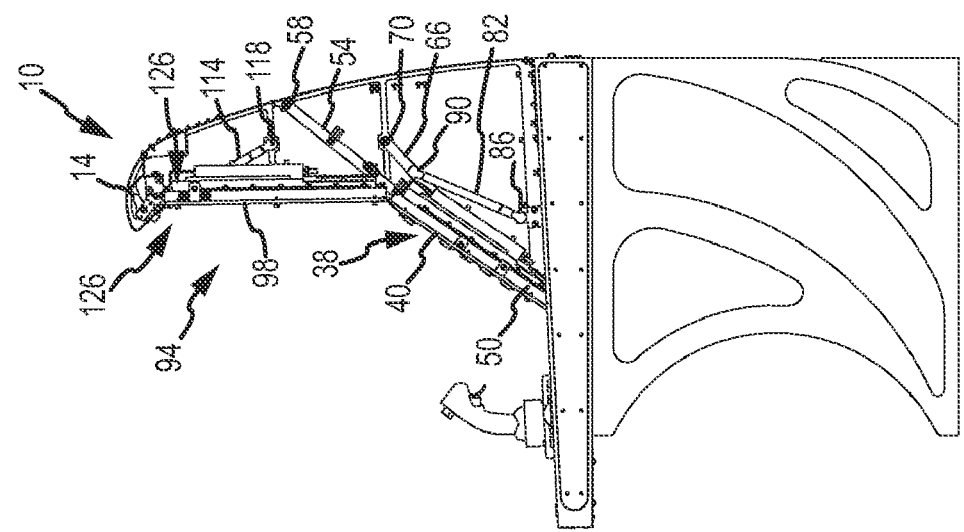

FIGS. 3A-C present sequential views of the opening of the upper display module 94. FIG. 3A is the closed position for the upper display module 94, FIG. 3B is an intermediate position for the upper display module 94, and FIG. 3C is the open position for the upper display module 94. Generally, the upper display module 94 undergoes a simple pivotal motion about the stationary pivot axis 130 via the hinge 126 when moving between its closed and open positions. The upper display module 94 preferably pivots through a range of more than 90 degrees when moving from its closed position to its open position, such that the upper display module 94 pivots at least slightly beyond a horizontal position. In one embodiment, the upper display module 94 pivots about 95 degrees when moving from its closed position to its open position. In any case, the screen 98 of the upper display module 94 projects at least generally upwardly when the upper display module 94 is in its open position. This allows for viewing of the screen 98 by personnel when performing maintenance on the console 10.

Figure 4A:
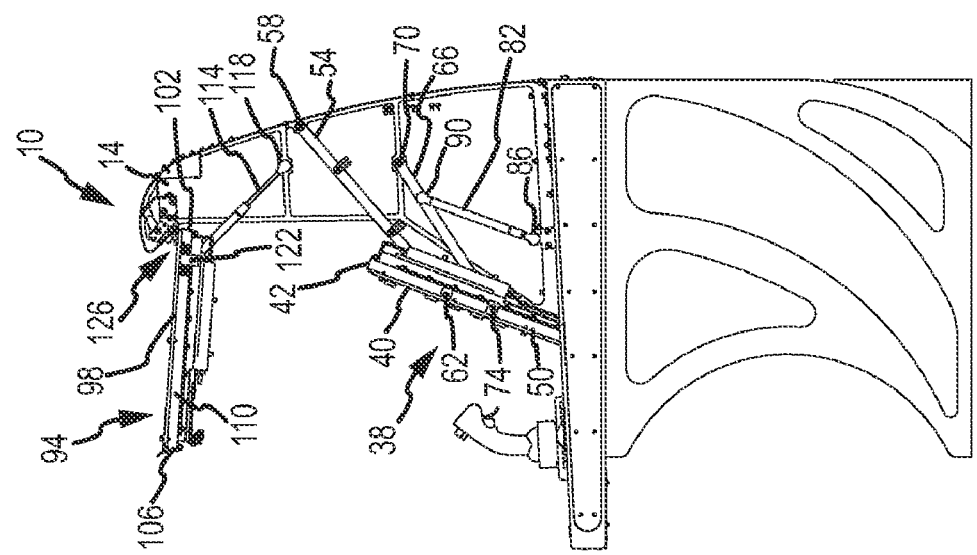
FIGS. 4A-C are sequential views of the opening of the lower display module.
Figure 4B:
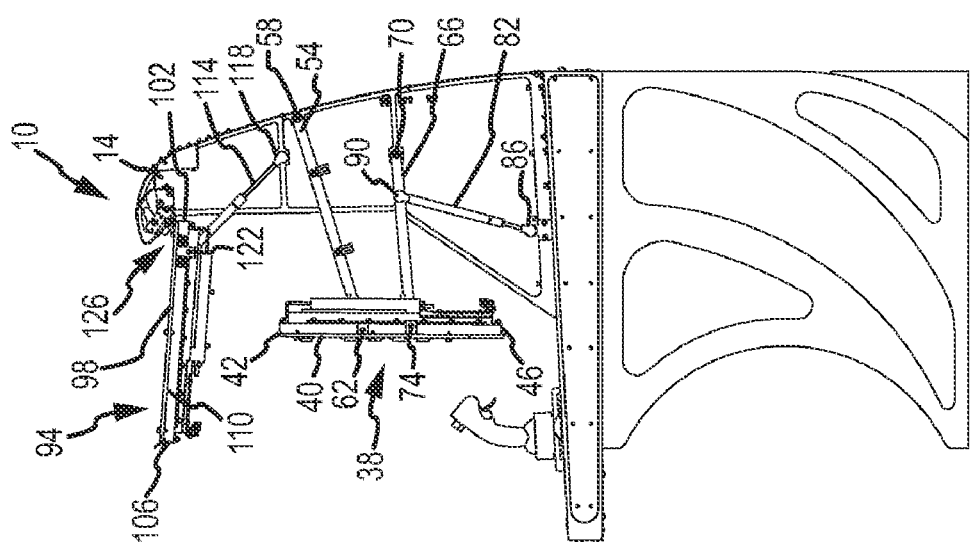
Figure 4C:
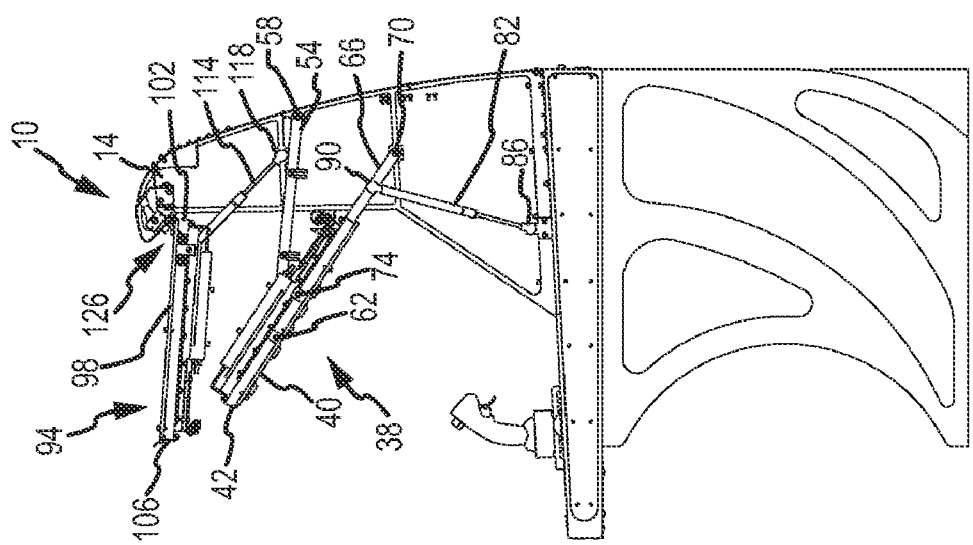

FIGS. 4A-C present sequential views of the opening of the lower display module 38. FIG. 4A is the closed position for the lower display module 38, FIG. 4B is an intermediate position for the lower display module 38, and FIG. 4C is the open position for the lower display module 38. Generally, the lower display module 38 moves relative to the housing 14 such that the screen 40 of the lower display module 38 projects both forwardly and downwardly when the lower display module 38 is in its open position. This movement of the lower display module 38 from its closed position to its open position is subject to a number of characterizations: 1) the lower display module 38 is both lifted and at least somewhat rotated; 2) the axis 78 (associated with pivot pins 74 between the lower linkages 66 and the lower display module 38) pivots about the axis 71 (associated with the pivot pins 70 between the lower linkages 66 and the lower display module 38) in a first direction, while the axis 64 (associated with pivot pins 62 between the upper linkages 54 and the lower display module 38) pivots about the axis 59 (associated with pivot pins 58 between the upper linkages 54 and the housing 14) in the same first direction when viewed from the same end of the axes 59, 71 (that is, the lower display module 38 simultaneously pivots about two different axes when moving between its closed and open positions); 3) the axis 78 (associated with pivot pins 74 between the lower linkages 66 and the lower display module 38) pivots about the axis 71 (associated with pivot pins 70 between the lower linkages 66 and the housing 14) in a first direction, while the lower display module 38 also pivots or turns about the axis 78 (associated with pivot pins 74 between the lower linkages 66 and the lower display module 38) in a second direction that is a direct opposite of the first direction when viewed from the same end of the axes 78, 71; and 4) the axis 64 (associated with pivot pins 62 between the upper linkages 54 and the lower display module 38) pivots about the axis 59 (associated with pivot pins 58 between the upper linkages 54 and the housing 14) in a first direction, while the lower display module 38 pivots or turns about the axis 64 (associated with pivot pins 62 between the upper linkages 54 and the lower display module 38) in a second direction that is a direct opposite of the first direction when viewed from the same end of the axes 64, 59.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A console, comprising:
   a housing;
   an upper display module pivotally interconnected with said housing;
   a lower display module;
   first, second, third, and fourth linkages interconnecting said housing and said lower play module; and
   electronics within said housing that is accessible by moving each of said upper and lower play module from a closed position to an open position;
   wherein said lower display module comprises first and second sides that are spaced in a lateral dimension, as well as upper and lower edges that are spaced in a longitudinal dimension, wherein said first linkage interconnects said housing with a first location on said lower display module, wherein said second linkage interconnects said housing with a second location on said lower display module that is longitudinally spaced from said first location, wherein said third linkage interconnects said housing with a third location on said lower display module that is laterally spaced from said first location, and wherein said fourth linkage interconnects said housing with a fourth location on said lower display module that is laterally spaced, from said second location and that is longitudinally spaced, from said third location.

2. A console, as claimed in claim 1, wherein:
said upper and lower display modules are on a common side of said console.

3. A console comprising:
a housing;
an upper display module pivotally interconnected with said housing;
a lower display module;
first, second, third, and fourth linkages interconnecting said housing and said lower display module;
electronics within said housing that is accessible by moving each of said upper and lower display module from a closed position to an open position; and
first and second upper actuators interconnecting said housing and said upper display module.

4. A console, as claimed in claim 3, wherein:
said upper display module comprises first and second sides that are spaced in a lateral dimension, wherein said first and second upper actuators interconnect with said upper display module at laterally spaced locations.

5. A console, as claimed in claim 4, wherein:
said first and second upper actuators each comprise first and second ends, wherein said first end of each of said first and second upper actuators is pivotally interconnected with said housing, and wherein said second end of each of said first and second upper actuators is pivotally interconnected with said upper display module at said laterally spaced locations.

6. A console, as claimed in claim 3, wherein:
said first and second upper actuators are each in the form of a linear actuator.

7. A console, as claimed in claim 3, wherein:
said first and second upper actuators are each in the form of a gas cylinder.

8. A console, as claimed in claim 1, wherein:
said upper display module is pivotable about a single, stationary axis.

9. A console comprising:
a housing;
an upper display module pivotally interconnected with said housing;
a lower display module;
first, second, third, and fourth linkages interconnecting said housing and said lower display module; and
electronics within said housing that is accessible by moving each of said upper and lower display module from a closed position to an open position;
wherein said upper display module comprises first and second sides and upper and lower edges, wherein said lower display module comprises first and second sides and upper and lower edges, and wherein said lower edge of said upper display module captures said upper edge of said lower display module when said upper and lower display modules are each in their respective said closed positions.

10. A console, as claimed in claim 1, wherein:
said first, second, third, and fourth linkages are each in the form of a single link.

11. A console, as claimed in claim 10, wherein:
said first and third linkages each interconnect with said housing along a common first axis, wherein said first and third linkages each interconnect with said lower display module along a common second axis, wherein said second and fourth linkages each interconnect with said housing along a common third axis, wherein said second and fourth linkages each interconnect with said lower display module along a common fourth axis, wherein said first, second, third, and fourth axes are parallel, wherein said first axis is at a higher elevation than said third axis, wherein said second axis is closer to said upper edge of said lower display module than said fourth axis, wherein said console further comprises first and second actuators that are each interconnected with said housing, wherein said first actuator is interconnected with said second linkage at an intermediate location between said third and fourth axes, and wherein said second actuator is interconnected with said fourth linkage at an intermediate location between said third and fourth axes.

12. A console, as claimed in claim 1, wherein:
said first, second, third, and fourth linkages are each pivotable only about a linkage-to-housing location associated with said housing and said respective first, second, third, and fourth locations associated with said lower display module, wherein each of said linkage-to-housing locations are spaced from each other, and wherein each of said first, second, third, and fourth locations are spaced from each other.

13. A console, as claimed in claim 12, further comprising:
first and second lower actuators that are each interconnected with said housing, wherein said first lower actuator is further interconnected with said second linkage, and wherein said second lower actuator is further interconnected with said fourth linkage.

14. A console, as claimed in claim 13, wherein:
said first and second lower actuators are each in the form of a linear actuator.

15. A console, as claimed in claim 13, wherein:
said first lower actuator exerts a force on said second linkage closer to its associated said linkage-to-housing location than its second location, and wherein said second lower actuator exerts a force on said fourth linkage closer to its associated said linkage-to-housing location than its associated said fourth location.

16. A console, as claimed in claim 1, wherein:
said first and third locations are closer to said upper edge of said lower display module than said second and fourth locations, respectively.

17. A console, as claimed in claim 16, wherein:
said first and third linkages interconnect with said housing within a first vertical reference plane, wherein said second and fourth linkages interconnect with said housing within a second vertical reference plane, wherein said second vertical reference plane is more forwardly disposed than said first vertical reference plane.

18. A console, as claimed in claim 17, further comprising:
first and second lower actuators extending between said housing and said second and fourth linkages, respectively.

19. A console, as claimed in claim 18, wherein:
said first lower actuator exerts a force on said second linkage closer to said second vertical reference plane than said second location; and
said second lower actuator exerts a force on said fourth linkage closer to said second vertical reference plane than said fourth location.

20. A console, as claimed in claim 1, further comprising:
first means for moving said upper display module between its said closed and open positions, wherein said upper display module comprises a screen that projects at least generally upwardly when in its said open position, and wherein said first means comprises first and second upper actuators; and second means for moving said lower display module between its said closed and open positions, wherein said lower display module comprises a screen that at least generally projects both downwardly and forwardly when in its said open position, and wherein said second means comprises said first, second, third, and fourth linkages.

21. A console, as claimed in claim 1, wherein:
said upper display module pivots about a single axis when said upper display module moves from its said closed position to its said open position; and
said first, second, third, and fourth linkages comprise means for both pivoting a pivot location on said lower display module about a first axis and simultaneously pivoting said lower display module about a second axis extending through said pivot location when said lower display module moves from its said closed position to its said open position.

22. A console, as claimed in claim 21, wherein:
said first and second axes are parallel.

23. A console, as claimed in claim 22, wherein:
said pivot location pivots about said first axis in a first direction when said lower display module moves from its said closed position to its said open position, and wherein said lower display module pivots about said second axis in a second direction when said lower display module moves from its said closed position to its said open position, wherein said first and second directions are opposite.

24. A console, as claimed in claim 1, further comprising:
first means for pivoting said lower display module about a first axis, and comprising said first and third linkages; and
second means for pivoting said lower display module about a second axis, and comprising said second and fourth linkages, wherein said first and second axes are parallel, and wherein said first and second means act simultaneously.

25. A console, comprising:
a housing;
an upper display module movable between closed and open positions;
a lower display module movable between closed and open positions;
first means for pivoting said lower display module about a first axis when moving between its said closed and open positions; and
second means for pivoting said lower display module about a second axis when moving between its said closed and open positions, wherein said first and second means act simultaneously; and
electronics within said housing that is accessible by moving each of said upper and lower display modules from their respective said closed position to their respective said open position.

26. A console, as claimed in claim 25, wherein:
said upper and lower displays modules are on a common side of said console.

27. A console, as claimed in claim 25, further comprising:
a first joint having a single degree of freedom and connected with each of said housing and said upper display module.

28. A console, as claimed in claim 25, further comprising:
first and second upper actuators interconnecting said housing and said upper display module.

29. A console, as claimed in claim 28, wherein:
said upper display module comprises first and second sides that are spaced in a lateral dimension, wherein said first and second upper actuators interconnect with said upper display module at laterally spaced locations.

30. A console, as claimed in claim 29, wherein:
said first and second upper actuators each comprise first and second ends, wherein said first end of each of said first and second upper actuators is pivotally interconnected with said housing, wherein said second end of each of said first and second upper actuators is pivotally interconnected with said upper display module at said laterally spaced locations.

31. A console, as claimed in claim 28, wherein:
said first and second upper actuators are each in the form of a linear actuator.

32. A console, as claimed in claim 28, wherein:
said first and second upper actuators are each in the form of a gas cylinder.

33. A console, as claimed in claim 25, wherein:
said upper display module is pivotable about a single, stationary axis.

34. A console, as claimed in claim 25, wherein:
said upper display module comprises first and second sides and upper and lower edges, wherein said lower display module comprises first and second sides and upper and lower edges, and wherein said lower edge of said upper display module captures said upper edge of said lower display module when said upper and lower display modules are each in their respective said closed positions.

35. A console, as claimed in claim 25, wherein:
said first means for pivoting comprises first and third linkages interconnecting said housing and said lower display module, and wherein said second means for pivoting comprises second and fourth linkages interconnecting said housing and said lower display module.

36. A console, as claimed in claim 35, wherein:
said first, second, third, and fourth linkages are each in the form of a single link.

37. A console, as claimed in claim 36, wherein:
said lower display module comprises first and second sides that are spaced in a lateral dimension, as well as upper and lower edges, wherein said first and third linkages each interconnect with said housing along a common first axis, wherein said first and third linkages each interconnect with said lower display module along a common second axis, wherein said second and fourth linkages each interconnect with said housing along a common third axis, wherein said second and fourth linkages each interconnect with said lower display module along a common fourth axis, wherein said first, second, third, and fourth axes are parallel, wherein said first axis is at a higher elevation than said third axis, wherein said second axis is closer to said upper edge of said lower display module than said fourth axis, wherein said console further comprises first and second actuators that are each interconnected with said housing, wherein said first actuator is interconnected with said second linkage at an intermediate location between said third and fourth axes, and wherein said second actuator is interconnected with said fourth linkage at an intermediate location between said third and fourth axes.

38. A console, as claimed in claim 35, wherein:
said first, second, third, and fourth linkages are each pivotable only about a first location associated with said housing and a second location associated with said lower display module, wherein each of said first locations are spaced from each other, and wherein each of said second locations are spaced from each other.

39. A console, as claimed in claim 38, further comprising:
first and second lower actuators that are each interconnected with said housing, wherein said first lower actuator is further interconnected with said second linkage, and wherein said second lower actuator is further interconnected with said fourth linkage.

40. A console, as claimed in claim 39, wherein:
said first and second lower actuators are each in the form of a linear actuator.

41. A console, as claimed in claim 39, wherein:
said first lower actuator exerts a force on said second linkage closer to its associated said first location than its associated said second location, and wherein said second lower actuator exerts a force on said fourth linkage closer to its associated said first location than its associated said second location.

42. A console, as claimed in claim 35, wherein:
said lower display module comprises first and second sides that are spaced in a lateral dimension, as well as upper and lower edges that are spaced in a longitudinal dimension, wherein said first linkage interconnects said housing with a first location on said lower display module, wherein said second linkage interconnects said housing with a second location on said lower display module that is longitudinally spaced from said first location, wherein said third linkage interconnects said housing with a third location on said lower display module that is laterally spaced from said first location, and wherein said fourth linkage interconnects said housing with a fourth location on said lower display module that is laterally spaced from said second location and that is longitudinally spaced from said third location.

43. A console, as claimed in claim 42, wherein:
said first and third locations are closer to said upper edge of said lower display module than said second and fourth locations, respectively.

44. A console, as claimed in claim 43, wherein:
said first and third linkages interconnect with said housing within a first vertical reference plane, wherein said second and fourth linkages interconnect with said housing within a second vertical reference plane, wherein said second vertical reference plane is more forwardly disposed than said first vertical reference plane.

45. A console, as claimed in claim 44, further comprising:
first and second lower actuators extending between said housing and said second and fourth linkages, respectively.

46. A console, as claimed in claim 45, wherein:
said first lower actuator exerts a force on said second linkage closer to said second vertical reference plane than said second location; and
said second lower actuator exerts a force on said fourth linkage closer to said second vertical reference plane than said fourth location.

47. A console, as claimed in claim 25, wherein:
said upper display module comprises a screen that projects at least generally upwardly when in its said open position, and wherein said lower display module comprises a screen that projects both generally downwardly and forwardly when in its said open position.

48. A console, as claimed in claim 25, wherein:
said first and second axes are parallel.

49. A console, as claimed in claim 25, wherein:
a first location on said lower display module pivots about said first axis in a first direction when said lower display module moves from its said closed position to its said open position, and wherein said lower display module pivots about a third axis in a second direction when said lower display module moves from its said closed position to its said open position, wherein said first and second directions are opposite, and wherein said third axis extends through said first location.

50. A console, comprising:
a housing;
an upper display module;
a first joint having a single degree of freedom and connected with each of said housing and said upper display module;
a lower display module comprising upper and lower edges and first and second sides, wherein said upper and lower display modules are on a common side of said console;
first, second, third, and fourth links, wherein a first end of each of said first and third links are pivotally interconnected with said housing along a common first axis, wherein a second end of each of said first and third links are pivotally interconnected with said lower display module along a common second axis, wherein a first end of each of said second and fourth links are pivotally interconnected with said housing along a common third axis, wherein a second end of each of said second and fourth links are pivotally interconnected with said lower display module along a common fourth axis, wherein said second axis is closer to said upper edge than said fourth axis, wherein said first end of said first and third links are within a first vertical reference plane, wherein said first end of said second and fourth links are within a second vertical reference plane, and wherein said second vertical reference plane is more forwardly disposed than said first vertical reference plane; and
electronics within said housing that is accessible by moving each of said upper and lower display modules from a closed position to an open position.

51. A console, as claimed in claim 50, further comprising:
first and second upper actuators extending between said housing and said upper display module; and
first and second lower actuators extending between said housing and said second and fourth links, respectively.

* * * * *